US009249895B2

(12) United States Patent
Hettinger et al.

(10) Patent No.: US 9,249,895 B2
(45) Date of Patent: Feb. 2, 2016

(54) SOLENOID VALVE

(75) Inventors: Christoph Hettinger, Ingelfingen (DE); Stefan Müller, Ohringen (DE)

(73) Assignee: Buerkert Werke GmbH, Ingelfingen (DE)

( * ) Notice: Subject to any disclaimer, the term of this patent is extended or adjusted under 35 U.S.C. 154(b) by 841 days.

(21) Appl. No.: 12/676,397

(22) PCT Filed: Aug. 29, 2008

(86) PCT No.: PCT/EP2008/007091
§ 371 (c)(1),
(2), (4) Date: Mar. 4, 2010

(87) PCT Pub. No.: WO2009/033576
PCT Pub. Date: Mar. 19, 2009

(65) Prior Publication Data
US 2010/0252760 A1    Oct. 7, 2010

(30) Foreign Application Priority Data
Sep. 10, 2007 (DE) ..................... 20 2007 012 652 U

(51) Int. Cl.
*F16K 31/08* (2006.01)
*F16K 11/24* (2006.01)
*F16K 27/02* (2006.01)
*F16K 31/06* (2006.01)
*F16K 27/00* (2006.01)

(52) U.S. Cl.
CPC ........... *F16K 31/0679* (2013.01); *F16K 27/003* (2013.01); *F16K 31/082* (2013.01)

(58) Field of Classification Search
CPC ....... F16K 27/003; F16K 31/082; F16K 7/14; F16K 11/24; F16K 31/0675; Y10T 137/87096; Y10T 137/5109
USPC ......... 137/594, 595, 597, 637, 270, 863, 269, 137/271, 898, 607; 251/129.17, 331, 335.2
See application file for complete search history.

(56) References Cited

U.S. PATENT DOCUMENTS 2,587,356 A * 2/1952 McPherson ................... 137/613
2,815,457 A * 12/1957 Cook .............................. 310/32
(Continued)

FOREIGN PATENT DOCUMENTS

CN    2844597        12/2006
DE    3146591 C2    6/1983
(Continued)

OTHER PUBLICATIONS

English Translation of International Preliminary Report on Patentability, dated Apr. 7, 2010.
(Continued)

*Primary Examiner* — Atif Chaudry
(74) *Attorney, Agent, or Firm* — Carlson, Gaskey & Olds, PC

(57) ABSTRACT

A double valve has two coils which can be piloted separately from each other and which each have a core. The coils are arranged in a common valve housing, and a flange housing is mounted to the valve housing. Two valve seats are arranged in the flange housing, and a diaphragm is associated with the two valve seats, with each coil being associated with one valve seat.

25 Claims, 5 Drawing Sheets

(56) References Cited

U.S. PATENT DOCUMENTS

| | | | |
|---|---|---|---|
| 3,322,350 A * | 5/1967 | Heinicke et al. | 239/172 |
| 3,399,697 A * | 9/1968 | Schwartz | 137/881 |
| 3,977,734 A | 8/1976 | Ronnhult et al. | |
| 4,924,241 A * | 5/1990 | Parks et al. | 347/54 |
| 5,139,226 A | 8/1992 | Baldwin | |
| 5,192,269 A * | 3/1993 | Poli et al. | 604/82 |
| 5,289,811 A * | 3/1994 | Covert et al. | 123/520 |
| 5,320,139 A * | 6/1994 | Paul et al. | 137/565.33 |
| 5,362,137 A * | 11/1994 | Kohno | 303/10 |
| 5,443,093 A | 8/1995 | Stoll et al. | |
| 5,845,672 A * | 12/1998 | Reuter et al. | 137/315.03 |
| 5,967,188 A * | 10/1999 | Chien-Chuan | 137/883 |
| 6,095,489 A * | 8/2000 | Kaneko et al. | 251/129.15 |
| 6,109,301 A | 8/2000 | Pfetzer | |
| 6,220,210 B1 * | 4/2001 | Kobayashi et al. | 123/90.11 |
| 6,328,279 B1 | 12/2001 | Adkins et al. | |
| 6,719,268 B2 * | 4/2004 | Fukano et al. | 251/129.17 |
| 6,776,192 B2 * | 8/2004 | Wigmore | 137/884 |
| 6,932,316 B2 * | 8/2005 | Herbert et al. | 251/30.02 |
| 7,032,879 B2 | 4/2006 | Hayashi | |
| 7,490,812 B2 | 2/2009 | Scheibe | |
| 7,772,726 B1 * | 8/2010 | Porter et al. | 307/328 |
| 2004/0222397 A1 | 11/2004 | Hayashi | |
| 2005/0254973 A1 * | 11/2005 | Berger et al. | 417/416 |
| 2006/0017034 A1 | 1/2006 | Fukano et al. | |

FOREIGN PATENT DOCUMENTS

| | | |
|---|---|---|
| DE | 4337703 C1 | 3/1995 |
| DE | 20100471 U1 | 3/2001 |
| DE | 202005013233 U1 | 10/2005 |
| EP | 1213521 A | 6/2002 |
| JP | 53034133 | 8/1951 |
| JP | 61000571 | 1/1986 |
| JP | 61179475 | 11/1986 |
| JP | 62002878 | 1/1987 |
| JP | 62039050 | 3/1987 |
| JP | 63082875 | 5/1988 |
| JP | 64041778 | 3/1989 |
| JP | H02114269 | 9/1990 |
| JP | H02124382 | 10/1990 |
| JP | H0671980 | 10/1994 |
| JP | 2000220764 | 8/2000 |
| JP | 2001289350 | 10/2001 |
| JP | 2005315326 | 11/2005 |
| WO | 95/28303 A1 | 10/1995 |
| WO | 2006089389 | 8/2006 |

OTHER PUBLICATIONS

German Search Report dated Oct. 25, 2007.
Lehrbuch "Elektromagnete" Kallenbach/Eick/Quendt, B.G. Teubner Verlab, 1994, ISBN 3-519-06163-5, cited in opposition filed in corresponding DE application.
Opposition filed in corresponding DE application 08801769.4, received May 7, 2013.

* cited by examiner

SOLENOID VALVE

RELATED APPLICATION

This application is the U.S. national phase of international application PCT/EP2008/007091, filed 29 Aug. 2008, which claimed priority to German application 20 2007 012 652.2, which was filed 10 Sep. 2007.

BACKGROUND

The invention relates to a solenoid valve that can switch a fluidic communication.

Such solenoid valves are known in different configurations. One example can be found in document DE 201 00 471 U1. It comprises an actuating drive having two coils which actuate a commutation rocker. The commutation rocker acts on a diaphragm which in turn can cooperate with two valve seats. The diaphragm simultaneously forms the separation between the actuating drive and the fluidic side of the valve.

Generally, attempts are made to configure such valves in an increasingly compact manner. However, any manufacturing tolerances have a more aggravating effect the more compact the valves are by design, because the actuating forces that are obtainable by the actuating drive of the valve (preferably a solenoid coil) are greatly reduced with an increasingly smaller constructional volume. At the same time, the manufacturing tolerances of the components can only be reduced with great expenditure. The fact that it is no longer possible to considerably reduce the required space for the fluidic and electrical connections further complicates the miniaturization.

The object of the invention consists in providing a compact solenoid valve.

SUMMARY

A double valve is provided to achieve this objective. The double valve has two coils which can be piloted separately from each other and which each have a core. The coils are arranged in a common valve housing, and a flange housing is mounted to the valve housing. Two valve seats are arranged in the flange housing, and a diaphragm is associated with the two valve seats. Each coil is associated with one valve seat. The valve is directed to the basic idea to provide two separately switchable fluidic connections, with electromagnetic actuating drives that are needed therefor, being included in a common housing. This leads to a compact design and reduces the manufacturing tolerances.

It is preferably provided that the diaphragm is configured in one piece. This supports the compact structure and avoids tolerance issues.

According to one example, it is provided that in the area of the valve seats, the diaphragm is respectively provided with a tappet coupled with one of the cores. A very direct transmission of the driving forces generated by the coils to the diaphragm is therefore possible.

It is preferably provided that the cores are shiftably guided in the valve housing and are mechanically connected with the tappets. This leads to low friction forces in the electromagnetic actuating drive since all components present in the power flow between the electromagnetic actuating drive and the diaphragm are guided in the valve housing, so that any tolerances during the mounting of the flange housing to the valve housing have no disturbing effect but can be compensated by the elasticity of the diaphragm.

It is preferably provided that each core is configured in two pieces and is made up of a fixed part and of a shiftable part, a spring being arranged therebetween. This reduces the moving masses in the electromagnetic actuating drive and permits a fast reaction of the valve.

According to one example, the two coils have a common magnetic circuit. In this way, a compact structure is obtained.

It is preferably provided that the diaphragm has the shape of a bone having an elongated central portion and two thickened end portions. Such a shape of the diaphragm is optimally adapted to the geometric marginal conditions in case of two adjacent coils, so that the diaphragm can be configured in one piece using a minimum of material.

According to an embodiment, it is provided that the diaphragm seals between the valve housing and the flange housing. The diaphragm thus has two functions by being used, on the one hand, to switch the fluidic communications, and, on the other hand, sealing the electromagnetic actuating drive with respect to the side of the valve through which a flow passes.

According to an embodiment, it is provided that the flange housing has two pairs of fluidic connections so that two closable fluidic communications are formed which each extend from one of the fluidic connections of a pair via a valve seat to the other fluidic connection of the pair. The double valve thus forms in a compact manner two 2/2-way valves. For this purpose, it can in particular be provided that the flange housing is equipped with at least one separating web between the two pairs of fluidic connections.

According to an alternative embodiment, it is provided that the flange housing has two fluidic connections associated with the valve seats, and a common central connection so that a closable fluidic communication is formed from each fluidic connection via the valve seat to the central connection. The double valve thus forms in a compact manner a 3/3-way valve, wherein it can be provided as a characteristic feature to open the two valve seats so that the entire valve can be rinsed.

Preferably, an electrical connection is provided for the two coils, a common ground connection and a positive connection for each coil being in particular provided. In this way, the double valve can be piloted by a cable having only three conductors.

According to an embodiment, the valve housing and the flange housing are provided with at least two fastening eyes so that the double valve can be screwed to a connecting plate. Alternatively, the valve housing can be provided with at least two latching recesses into which two latching hooks of a mounting frame can engage. In both cases, the double valve can be assembled with low effort.

An assembly is comprised of the valve housing having an electromagnetic actuating drive, on the one hand, and of two different flange housings, on the other hand, namely, on the one hand, a flange housing which has two pairs of fluidic connections and which two 2/2-way valves are formed, and, on the other hand, a flange housing which has two fluidic connections associated with the valve seats and a common central connection and by which a 3/3-way valve is formed. In this way it is possible to realize the double 2/2-way valve or the 3/3-way valve by a simple exchange of the flange housings with the same valve housing. A fast exchange is particularly possible when the valve housing is mounted using a latching connection.

These and other features of the present invention can be best understood from the following specification and drawings, the following of which is a brief description.

BRIEF DESCRIPTION OF THE DRAWINGS

The invention will be described below with reference to an example embodiment which is illustrated in the accompanying drawings, in which.

DETAILED DESCRIPTION OF THE EMBODIMENT

Figure 1A:
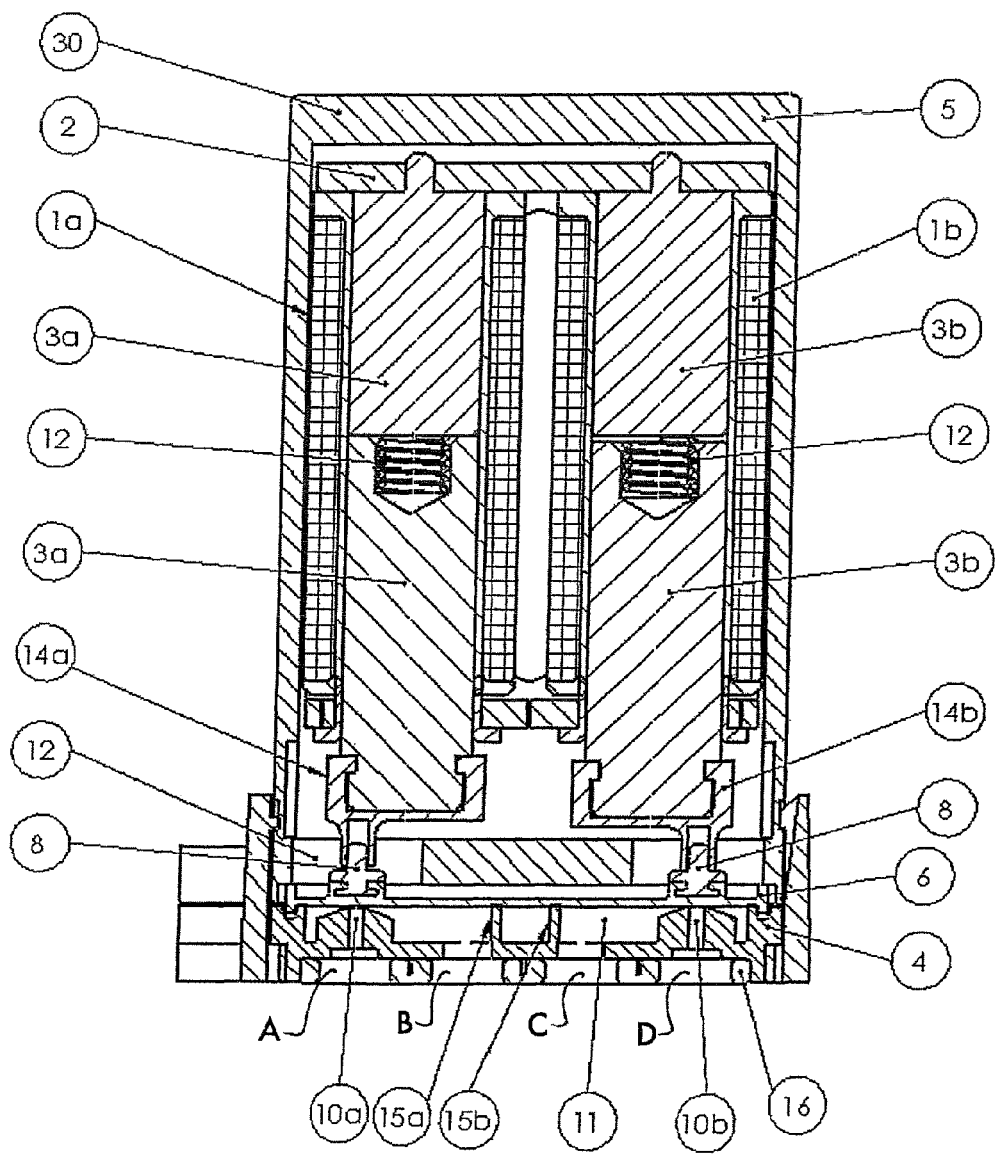
FIG. 1a shows a section through a double valve according to the invention, a flange housing being used by which two 2/2-way valves are realized.
Figure 1B:
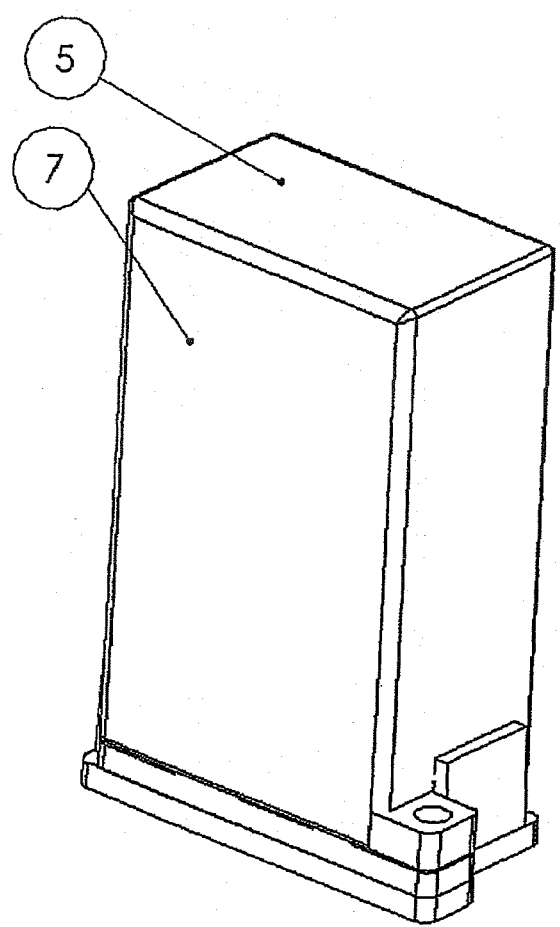
FIG. 1b shows the double valve of FIG. 1 in a perspective view.
Figure 2:
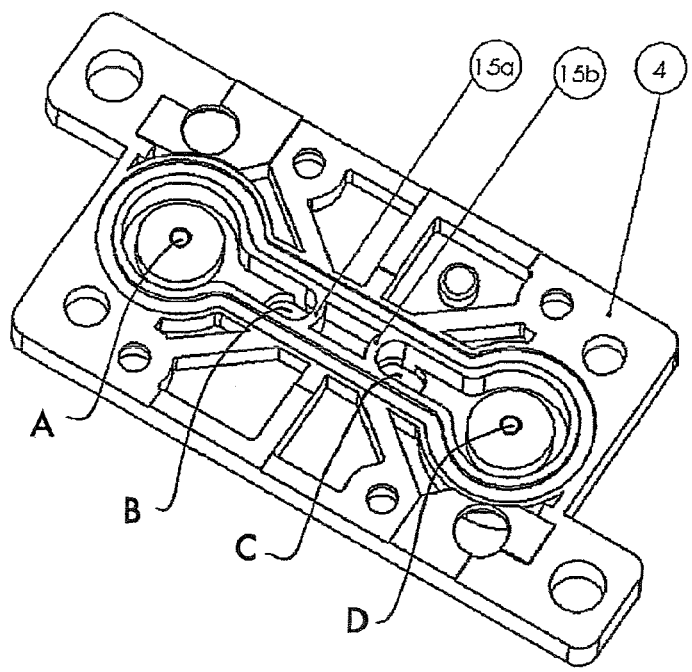
FIG. 2 shows in a perspective view the flange housing used in the double valve of FIG. 1.
Figure 3:
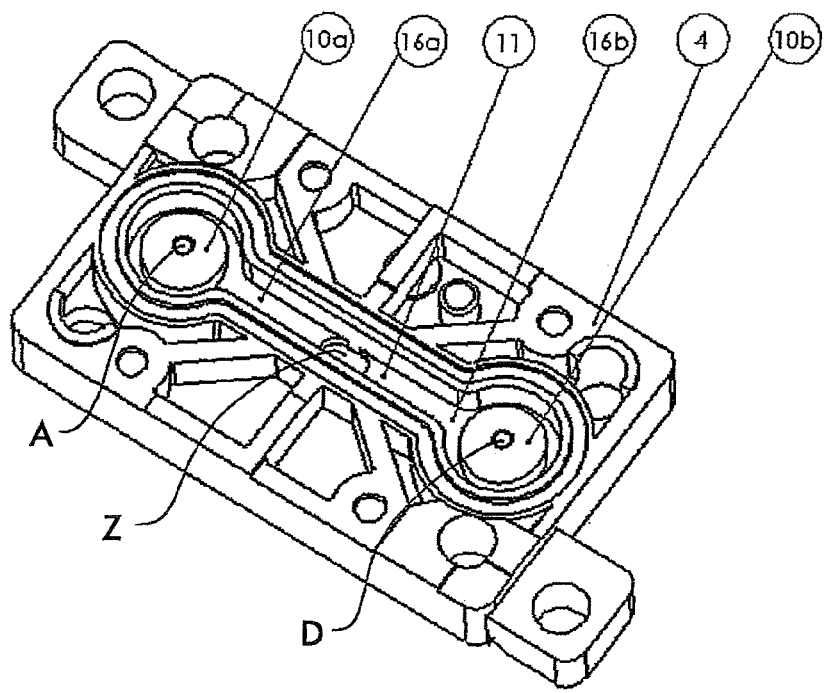
FIG. 3 shows a flange housing to be used alternatively, by which a 3/3-way valve can be realized.
Figure 4:
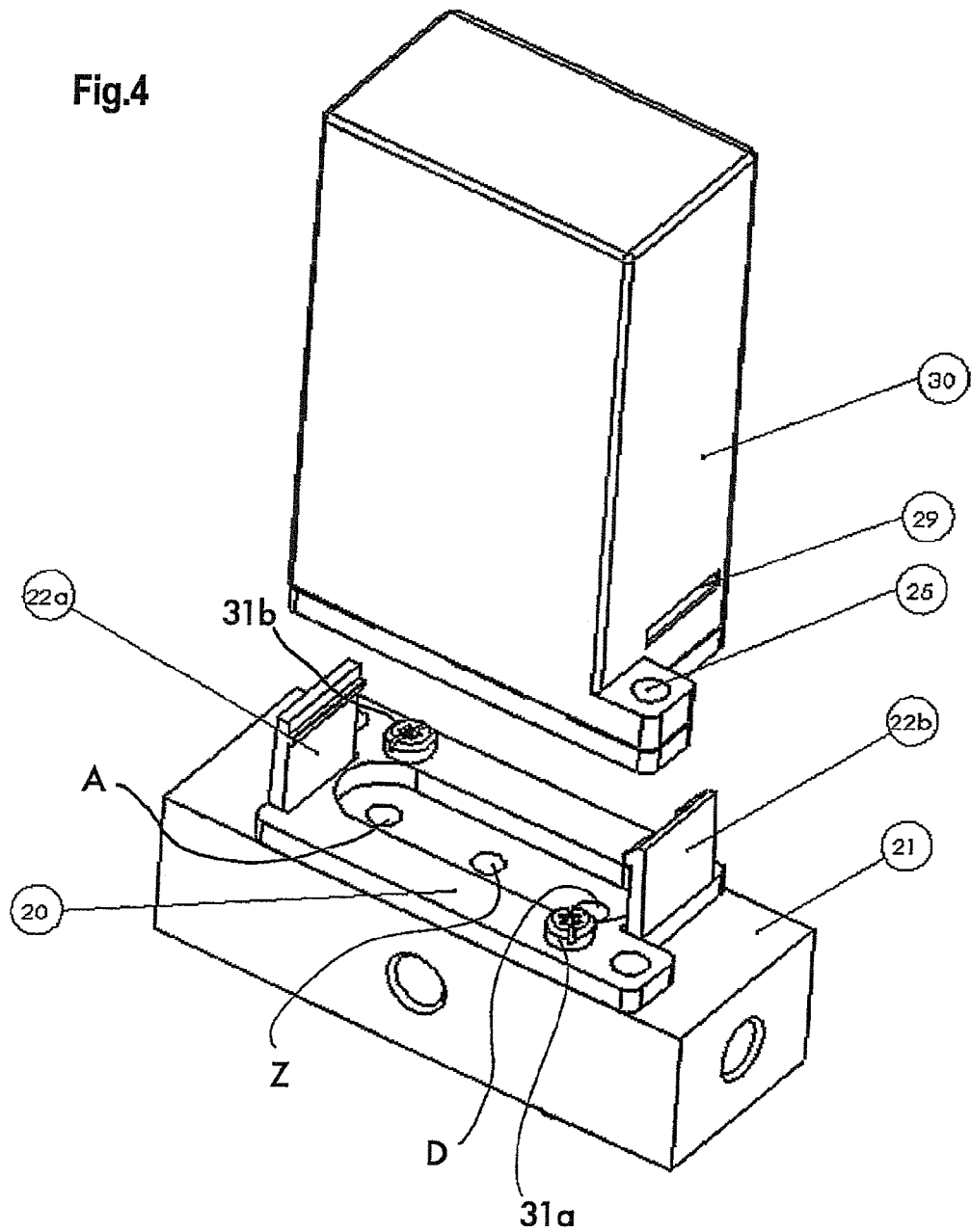
FIG. 4 shows an exploded view of a double valve to be fastened to a base plate.
Figure 5:
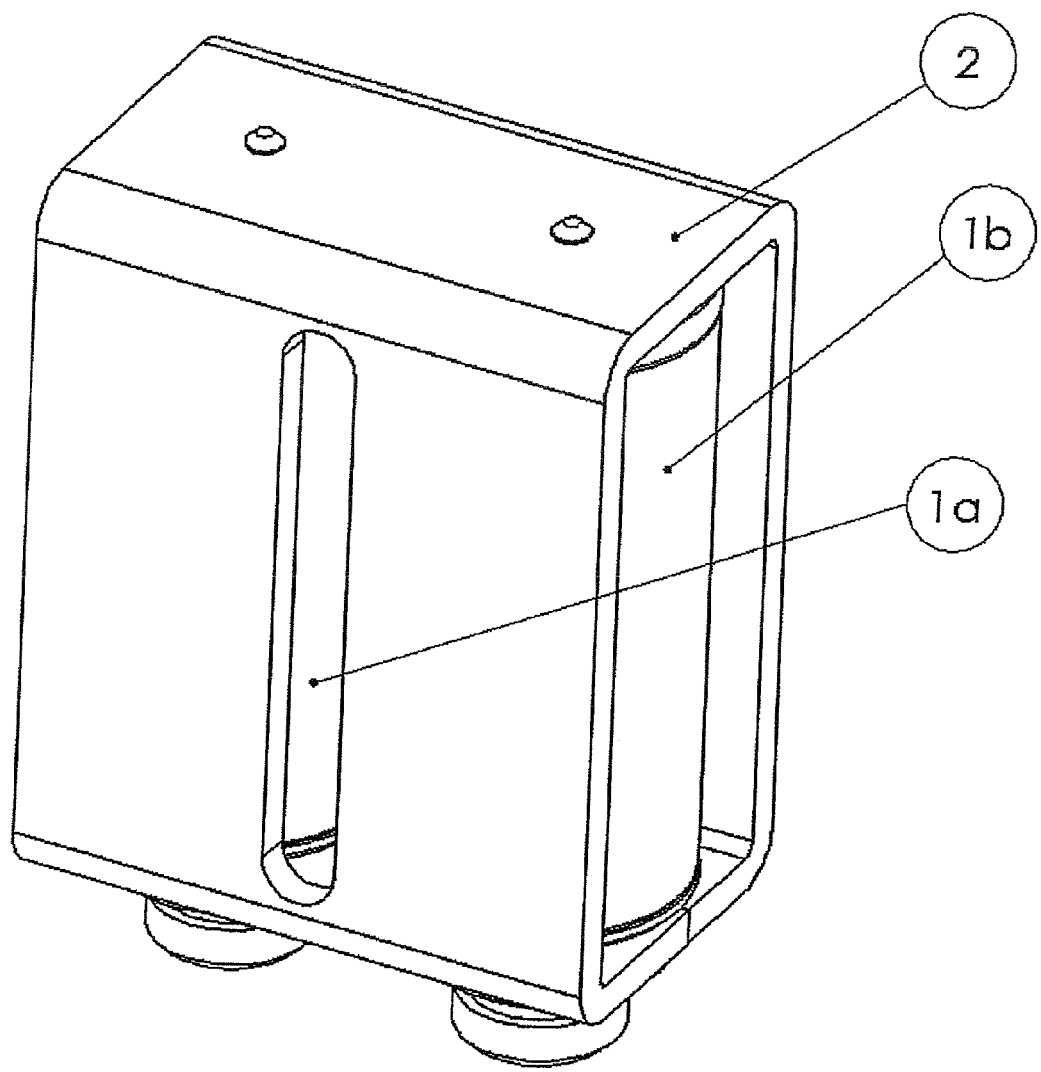
FIG. 5 shows in a perspective view the electromagnetic actuating drive used in the double valve of FIG. 1.

In the double valve, both the fluidic and the electrical connections, and also further valve inner parts of 2 valves, are included in one housing. This results in a very compact structure of the valves and additionally in cost savings due to the fact that the components including the valve housing, the diaphragm, the magnetic circuit, the electrical connection and the coil covering are jointly used by both valves. The double valve is compatible with the already known 3-way valve both with regard to the external dimensions and to the fluidic and electrical connections, so that both valve types can easily be combined in systems. Though in a further embodiment of the double valve the two drives of the valve can be switched independently of each other, the fluidic parts of the two valves are connected. A 3-way valve is thus formed which has 3 possible switching positions: both valve seats are closed, one seat is closed and one seat is open, respectively, and both seats are closed. This function permits the valve to be rinsed when two seats are open, for example.

The double valve 30 is made up of two coils 1a, 1b having a common magnetic circuit 2, two cores 3a, 3b, a common flange housing 4, a common valve housing 5, a common cover 7, a common diaphragm 6, and a common sealing element 16. The valve seats 10a, 10b are incorporated in the flange housing 4.

The diaphragm 6 separates that part of the valve which is in contact with the medium from the driving part formed by the coils 1a, 1b. The diaphragm 6 is actuated by the two cores 3a, 3b. The cores are connected with the diaphragm via the coupling elements 14a, 14b. Metallic tappets 8 are inserted in the diaphragm 6. In a currentless state, the cores 3a, 3b stressed by the two pressure springs 12 press the diaphragm onto the valve seats 10a, 10b present in the flange housing and thus close the seats.

When applying a voltage to one of the coils 1a, 1b, a magnetic flux is generated in the magnetic circuit 2, which draws the associated core 3a, 3b into the coil against the pressure spring 12. The diaphragm is thus lifted off from the valve seat 10a closed in a currentless state, and the valve seat is open.

In the structure of the double valve as a 2-way valve, the two areas around the two valve seats 10a, 10b are separated from each other by one or more webs 15a, 15b. The sealing element 16 seals the valve with respect to the plate 21. In the structure as a 3/3-way valve, the webs 15a, 15b are omitted; the areas 16a, 16b around the two valve seats 10a, 10b are connected with each other via the channel 11.

In an embodiment, to fluidically fasten the valve 30 on a plate, a frame 20 is first fastened on the plate 21. The valve or the double valve is then placed onto the frame 20 and connected with the frame by a detachable connection, preferably a latching connection using latching hooks 22a, 22b. The latching hooks 22a, 22b engage in a recess in the valve 30. The valve is thus firmly connected with the plate, and the fluidic connections of the valve are connected with those in the plate. Alternatively, the valve 30 can also be screwed to the plate 21 via the fastening eyes 25 without using the fastening frame 20. The fastening frame is preferably fastened to the plate 21 with fastening screws 31a, 31b.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A double valve comprising:
   two coils which can be piloted separately from each other and each have a core,
   electromagnetic actuating drives for each coil comprising first and second portions of a common magnetic circuit, each portion being disposed adjacent to two sides of one of the coils and arranged to channel magnetic flux from the core of the associated coil, when energized, through said portion of the magnetic circuit;
   a common valve housing in which the two coils are arranged;
   a flange housing mounted to the common valve housing and in which two valve seats are arranged;
   a diaphragm associated with the two valve seats, each coil being associated with one valve seat; and
   an electrical connection provided for the two coils that comprises a common ground connection and for each coil a positive connection; and wherein the first and second portions of the common magnetic circuit are magnetically shielded from one another by air gaps provided in sidewalls of the common magnetic circuit, the air gaps being arranged between the coils and along a length of the coils.

2. The double valve according to claim 1, wherein the diaphragm is formed in one piece.

3. The double valve according to claim 1, wherein in an area of the two valve seats, the diaphragm is respectively provided with a tappet coupled with one of the cores.

4. The double valve according to claim 3, wherein the cores are shiftably guided in the common valve housing and are mechanically connected with the tappet.

5. The double valve according to claim 1, wherein each core is configured in two parts and is made up of a fixed part and a shiftable part, a spring being arranged therebetween.

6. The double valve according to claim 1, wherein the diaphragm has a shape of a bone having an elongated central portion and two thickened end portions.

7. The double valve according to claim 1, wherein the diaphragm seals between the common valve housing and the flange housing.

8. The double valve according to claim 1, wherein the flange housing has two pairs of fluidic connections so that two closable fluidic communications are formed each extending from one of the fluidic connections of one pair of the two pairs of fluidic connections via a valve seat to the other fluidic connection of the other pair of the two pairs of fluidic connections.

9. The double valve according to claim 8, wherein the flange housing is provided with at least one separating web between the two pairs of fluidic connections.

10. The double valve according to claim 1, wherein the flange housing has two fluidic connections associated with the valve seats and a common central connection so that a closable fluidic communication is formed from each fluidic connection via the valve seat to the common central connection.

11. The double valve according to claim 1, wherein the common valve housing and the flange housing are provided with at least two fastening eyes to attach the double valve to a connecting plate.

12. The double valve according to claim 1, wherein the common valve housing is provided with at least two latching recesses into which two latching hooks of a mounting frame can engage.

13. The double valve according to claim 1 wherein the common magnetic circuit comprises a top wall connecting the coils, sidewalls extending from the tops wall along a length of the coils, and a slot in the sidewalls forming an air gap that magnetically shields the coils from each other to allow for separate piloting.

14. An assembly comprising:
a valve housing which has an electromagnetic actuating drive;
two coils arranged within the valve housing and which can be piloted separately from each other;
electromagnetic actuating drives for each coil comprising first and second portions of a common magnetic circuit, each portion being disposed adjacent to two sides of one of the coils and arranged to channel magnetic flux from the core of the associated coil, when energized, through said portion of the magnetic circuit;
a first flange housing configured to be attached to the valve housing; and
a second flange housing configured to be attached to the valve housing, the first and second flange housings being interchangeable; and wherein the first and second portions of the common magnetic circuit are magnetically shielded from one another by air gaps provided in sidewalls of the common magnetic circuit, the air gaps being arranged between the coils and along a length of the coils.

15. The assembly according to claim 14, wherein the valve housing includes a selectively detachable connection to allow for an exchange of one of the first and second flange housings for the other of the first and second flange housings.

16. The assembly according to claim 15, wherein the selectively detachable connection comprises at least one of a latching or fastening interface.

17. The assembly according to claim 14 including two cores with each coil being associated with one core, and wherein the cores are shiftably guided in the valve housing.

18. The assembly according to claim 17, wherein each core is configured in two pieces and is made up of a fixed part and of a shiftable part with a resilient member being arranged therebetween, and wherein the resilient members are configured to bias the cores to a closed position, and wherein when energizing at least one of the coils, a magnetic flux is generated in the magnetic circuit to draw an associated one of the shiftable parts into the at least one coil to provide an open position.

19. The assembly according to claim 17 including a common diaphragm coupled to each of the cores.

20. The assembly according to claim 14 wherein the common magnetic circuit comprises a top wall connecting the coils, sidewalls extending from the tops wall along a length of the coils, and a slot in the sidewalls forming an air gap that magnetically shields the coils from each other to allow for separate piloting.

21. An assembly comprising:
a valve housing which has an electromagnetic actuating drive;
a first flange housing having two pairs of fluidic connections associated with valve seats to form two 2/2-way valves; and
a second flange housing having two fluidic connections associated with valve seats and a common central connection to form a 3/3-way valve, wherein the first and second flange housings are interchangeable, and wherein the valve housing includes a selectively detachable connection to allow for an exchange of one of the first and second flange housings for the other of the first and second flange housings; and the assembly including two coils arranged within the valve housing to be piloted separately from each other, and wherein the electromagnetic actuating drive comprises electromagnetic actuating drives for each coil comprising first and second portions of a common magnetic circuit, each portion being disposed adjacent to two sides of one of the coils and arranged to channel magnetic flux from the core of the associated coil, when energized, through said portion of the magnetic circuit and wherein the first and second portions of the common magnetic circuit are magnetically shielded from one another by air gaps provided in sidewalls of the common magnetic circuit, the air gaps being arranged between the coils and along a length of the coils.

22. The assembly according to claim 21, wherein areas around the valve seats of the first flange housing are separated from each other by at least one web, and wherein areas around the valve seats in the second flange housing are connected with each other via a channel.

23. The assembly according to claim 21 wherein the common magnetic circuit comprises a top wall connecting the coils, sidewalls extending from the tops wall along a length of the coils, and a slot in the sidewalls forming an air gap that magnetically shields the coils from each other to allow for separate piloting.

24. A double valve comprising:
two coils which can be piloted separately from each other and each have a core,
electromagnetic actuating drives for each coil comprising first and second portions of a common magnetic circuit, each portion being disposed adjacent to two sides of one of the coils and arranged to channel magnetic flux from the core of the associated coil, when energized, through said portion of the magnetic circuit;
a common valve housing in which the two coils are arranged;
a flange housing mounted to the common valve housing and in which two valve seats are arranged;
a diaphragm formed in one piece and being associated with the two valve seats, each coil being associated with one valve seat, and wherein the diaphragm seals between the common valve housing and the flange housing; and
an electrical connection provided for the two coils that comprises a common ground connection and for each coil a positive connection; and wherein the first and second portions of the common magnetic circuit are magnetically shielded from one another by air gaps provided in sidewalls of the common magnetic circuit, the air gaps being arranged between the coils and along a length of the coils.

25. The double valve according to claim 24 wherein the common magnetic circuit comprises a top wall connecting the coils, sidewalls extending from the tops wall along a length of the coils, and a slot in the sidewalls forming an air gap that magnetically shields the coils from each other to allow for separate piloting.

* * * * *